(12) United States Patent
Reuter et al.

(10) Patent No.: US 7,926,888 B2
(45) Date of Patent: Apr. 19, 2011

(54) BRAKING APPARATUS

(75) Inventors: David F. Reuter, Beavercreek, OH (US); Earl Wayne Lloyd, Lebanon, OH (US); Schuyler Scott Shaw, Tipp City, OH (US); Deron C. Littlejohn, West Bloomfield, MI (US)

(73) Assignee: BWI Company Limited S.A., Luxembourg (LU)

( * ) Notice: Subject to any disclaimer, the term of this patent is extended or adjusted under 35 U.S.C. 154(b) by 1075 days.

(21) Appl. No.: 11/487,158

(22) Filed: Jul. 14, 2006

(65) Prior Publication Data
US 2008/0257669 A1    Oct. 23, 2008

Related U.S. Application Data

(60) Provisional application No. 60/699,670, filed on Jul. 15, 2005.

(51) Int. Cl.
*B60T 8/64* (2006.01)
(52) U.S. Cl. ............. 303/151; 303/152; 303/116.2
(58) Field of Classification Search ............. 303/151, 303/152, 155, 116.2
See application file for complete search history.

(56) References Cited

U.S. PATENT DOCUMENTS

| | | | |
|---|---|---|---|
| 4,730,877 A * | 3/1988 | Seibert et al. | 303/52 |
| 5,161,862 A | 11/1992 | Kunz et al. | |
| 5,253,929 A | 10/1993 | Ohori | |
| 5,433,512 A | 7/1995 | Aoki et al. | |
| 5,472,264 A | 12/1995 | Klein et al. | |
| 5,511,859 A | 4/1996 | Kade et al. | |
| 5,560,690 A | 10/1996 | Hattori et al. | |
| 5,890,778 A | 4/1999 | Sager | |
| 6,070,953 A | 6/2000 | Miyago | |
| 6,231,134 B1 | 5/2001 | Fukasawa et al. | |
| 6,406,105 B1 | 6/2002 | Shimada et al. | |
| 6,416,137 B2 * | 7/2002 | Hofmann et al. | 303/113.4 |
| 6,464,307 B1 * | 10/2002 | Yoshino | 303/11 |
| 6,494,547 B2 * | 12/2002 | Higashimura et al. | 303/152 |
| 6,508,523 B2 | 1/2003 | Yoshino | |
| 6,598,943 B2 | 7/2003 | Harris | |
| 6,735,511 B2 | 5/2004 | Nakamura et al. | |
| 6,837,552 B2 | 1/2005 | Reuter et al. | |
| 2003/0062770 A1 * | 4/2003 | Sasaki et al. | 303/152 |
| 2003/0234573 A1 | 12/2003 | Reuter et al. | |
| 2003/0234574 A1 | 12/2003 | Reuter et al. | |
| 2004/0041466 A1 * | 3/2004 | Giers | 303/20 |
| 2004/0135432 A1 | 7/2004 | Reuter et al. | |
| 2006/0066146 A1 | 3/2006 | Otomo | |

* cited by examiner

*Primary Examiner* — Bradley T King
(74) *Attorney, Agent, or Firm* — Dickinson Wright PLLC

(57) ABSTRACT

The present invention discloses a braking apparatus for a vehicle having a brake pedal. The braking apparatus includes a master cylinder having a reservoir for retaining a brake fluid. At least one hydraulically actuated brake is in fluid communication with the master cylinder and a control unit is in electrical communication with the hydraulically actuated brake. A replenishment system is in fluid communication with the master cylinder and in electrical communication with the control unit for feeding the brake fluid into the replenishment system during a first condition and feeding the brake fluid from the replenishment system into the hydraulically actuated brake during a second condition after initial depression of the brake pedal to provide consistent pedal feel and braking pressure.

19 Claims, 12 Drawing Sheets

BRAKING APPARATUS

CROSS REFERENCE TO RELATED APPLICATION

This application claims the benefit of U.S. provisional patent application Ser. No. 60/699,670, which was filed on Jul. 15, 2005.

BACKGROUND OF THE INVENTION

1. Field of the Invention

The present invention relates to a braking apparatus for a vehicle having a brake pedal.

2. Description of the Prior Art

Various apparatuses relating to braking systems are known in the art. Such an apparatus is disclosed in U.S. Pat. No. 6,837,552 (the '552 patent) to Reuter, et al. The '552 patent discloses a braking apparatus for a vehicle having a brake pedal. The braking apparatus includes a master cylinder having a reservoir for retaining brake fluid. The braking apparatus further includes a pair of front hydraulically actuated brakes and a pair of rear electrically actuated brakes for braking the vehicle when the brake pedal is depressed. An emulator is in fluid communication with the master cylinder and fills with brake fluid when the brake pedal is depressed to provide consistent pedal feel. However, the emulator lacks a replenishment system to feed the brake fluid to the hydraulically actuated brakes to provide consistent pedal feel and braking pressure while decelerating the vehicle.

Another braking apparatus known in the art is commonly referred to as a brake by wire system. The brake by wire system may include a plurality of electrically actuated brakes or a plurality of electro-hydraulically actuated brakes for decelerating a vehicle when a brake pedal is depressed. The brake by wire system provides immediate braking response when the brake pedal is depressed. However, the typical brake by wire system has many complex parts and is expensive to manufacture.

Therefore, there remains a need to develop a braking apparatus having a replenishment system for delivering brake fluid from an emulator to at least one hydraulically actuated brake to provide consistent pedal feel and braking pressure while providing immediate braking response to decelerate the vehicle.

SUMMARY OF THE INVENTION AND ADVANTAGES

The present invention provides for a braking apparatus for a vehicle having a brake pedal. The braking apparatus includes a master cylinder having a reservoir for retaining brake fluid. At least one hydraulically actuated brake is in fluid communication with the master cylinder and a control unit is in electrical communication with the hydraulically actuated brake. A replenishment system is in fluid communication with the master cylinder and in electrical communication with the control unit for feeding the brake fluid into the replenishment system during a first condition and feeding the brake fluid from the replenishment system into the hydraulically actuated brake during a second condition after initial depression of the brake pedal to provide consistent pedal feel and braking pressure.

The present invention therefore provides for a replenishment system for delivering brake fluid from an emulator to at least one hydraulically actuated brake to provide consistent pedal feel and braking pressure. Plus, the braking apparatus provides the same braking response as a brake by wire system while having less complex parts, which decreases cost.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
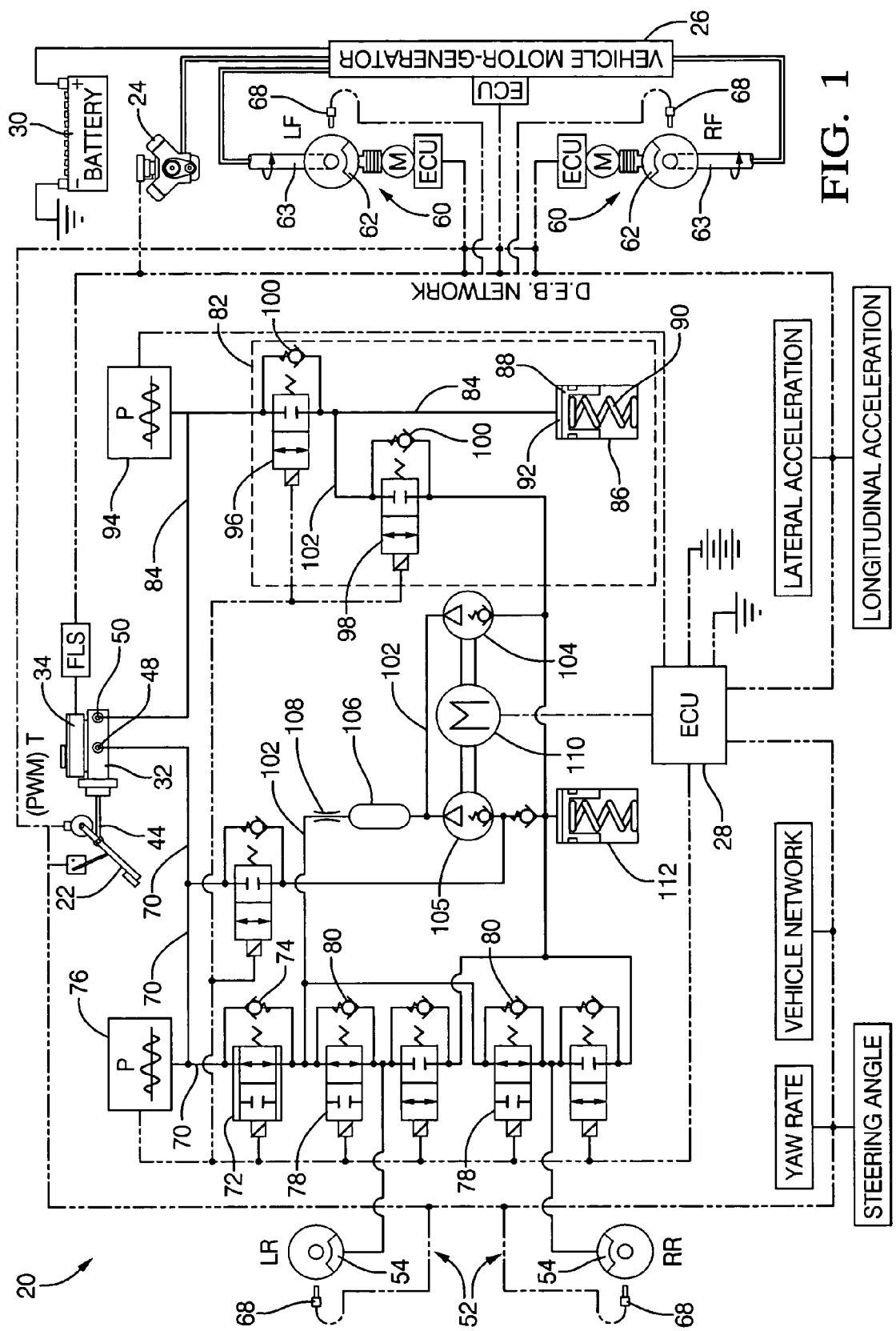
FIG. 1 is a schematic view of a first embodiment of a braking apparatus having a damper chamber and an orifice.
Figure 3:
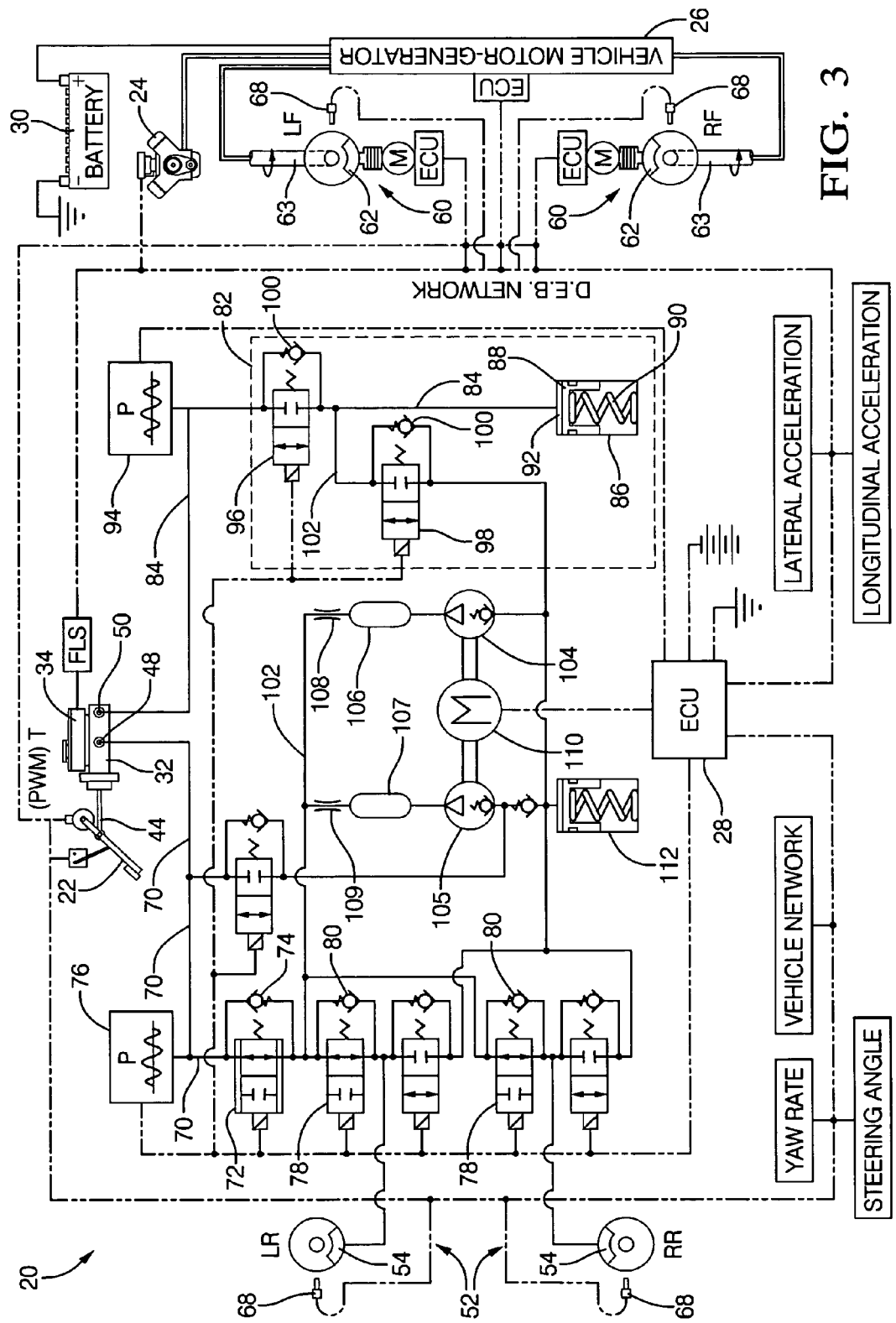
FIG. 3 is a schematic view of the first embodiment of the braking apparatus having a pair of damper chambers and a pair of orifices.

Referring to the Figures, wherein like numerals indicate like or corresponding parts throughout the several views, a braking apparatus 20 for a vehicle (not shown) having a brake pedal 22 is generally shown in FIGS. 1 and 3. The braking apparatus 20 is preferably for a hybrid vehicle (not shown). The hybrid vehicle utilizes a combustion engine 24 and a motor-generator 26 to drive the vehicle for providing gas savings. When the hybrid vehicle decelerates, a control unit 28 signals to the motor-generator 26 to generate energy for recharging a battery 30. All or a portion of the energy generated from the motor-generator 26 is used to brake the vehicle as discussed below. The braking apparatus 20 may be used with an anti-lock brake system, a traction control system, an electronic stability control system and/or any other acceptable braking or control system known to one of ordinary skill in the art.

Figure 2:
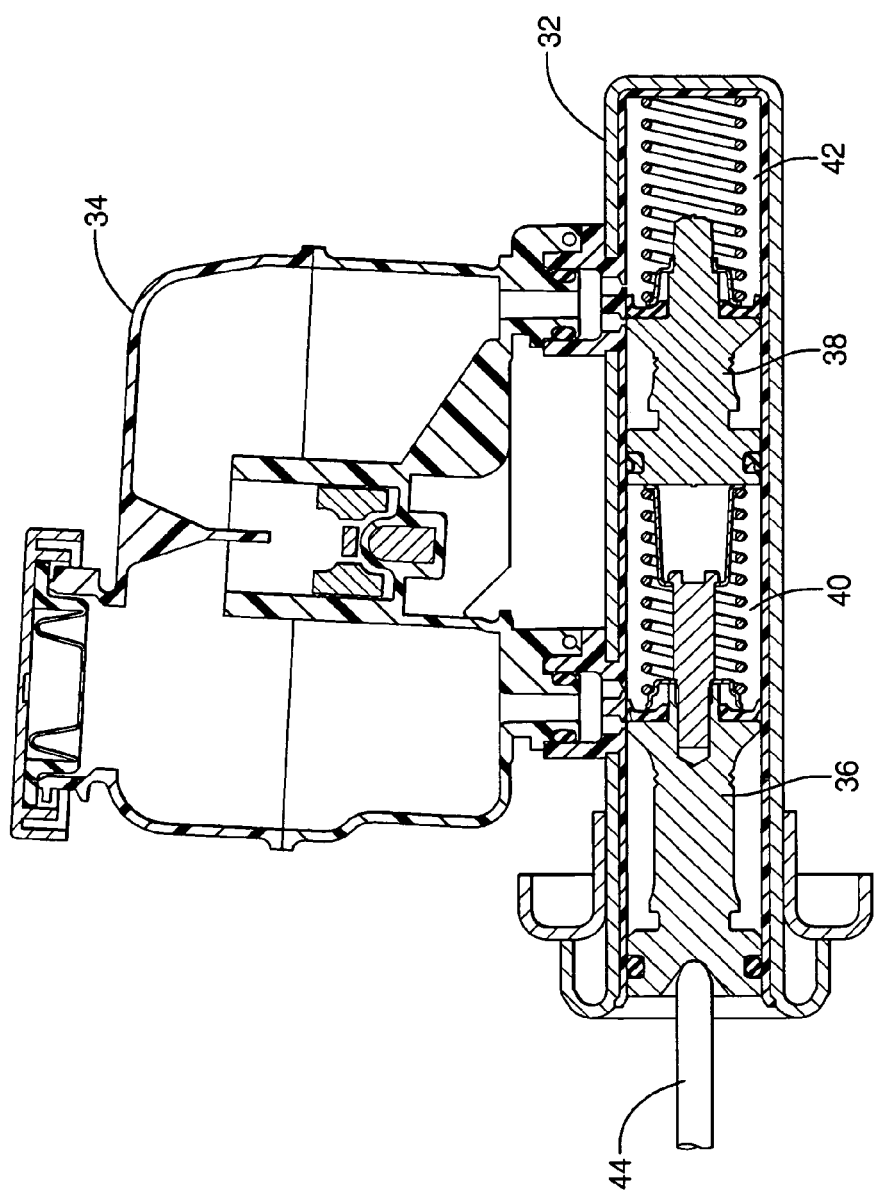
FIG. 2 is a cross-sectional view of a master cylinder having a reservoir.
Figure 9:
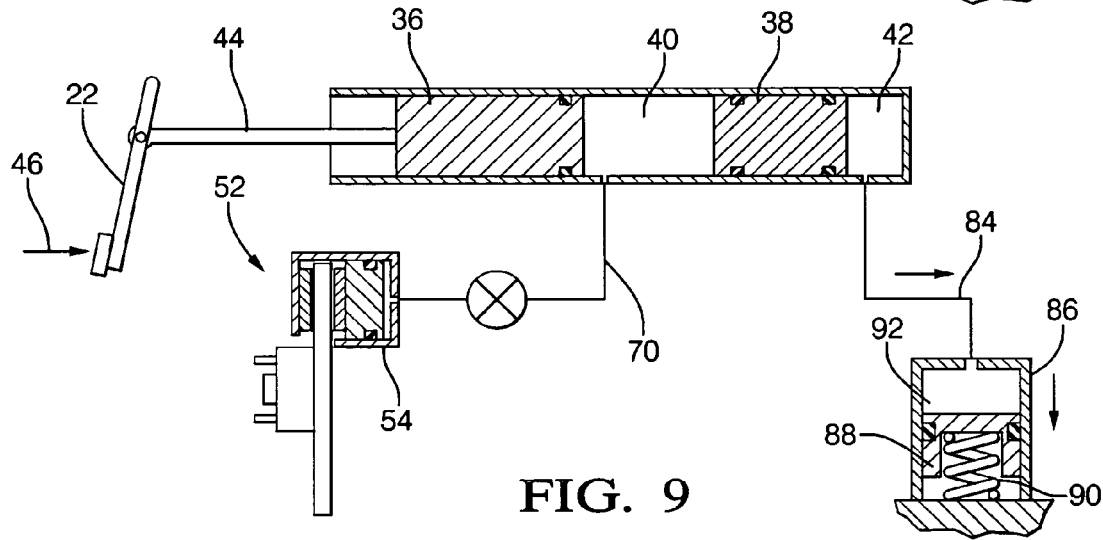
FIG. 9 is a cross-sectional view of the second embodiment and the third embodiment of the master cylinder, the emulator, and the hydraulically actuated brake during the first condition after initially depressing the brake pedal.
Figure 10:
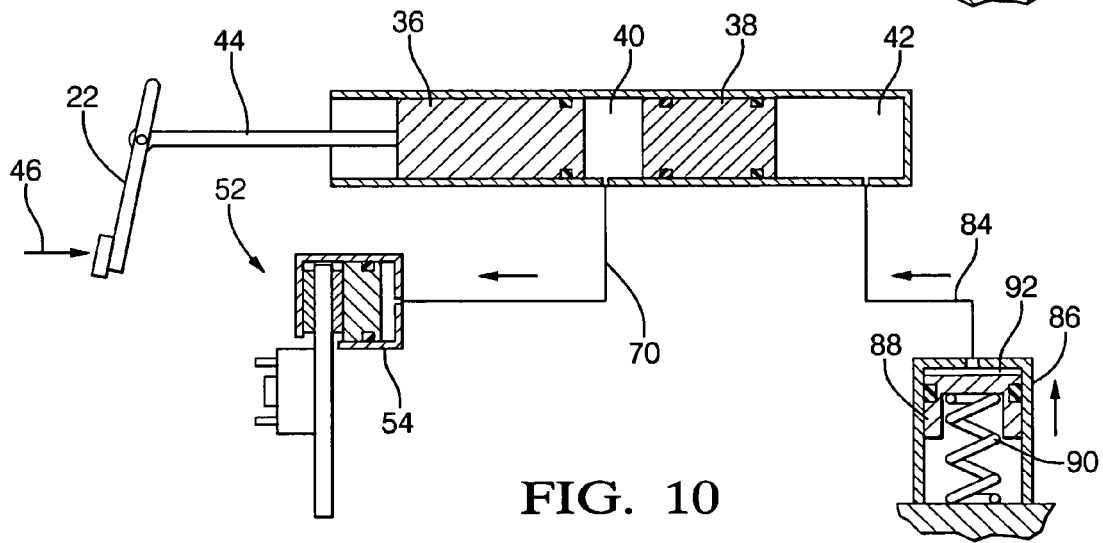
FIG. 10 is a cross-sectional view of the second embodiment and the third embodiment of the master cylinder, the emulator, and the hydraulically actuated brake during the second condition after initially depressing the brake pedal.

Referring to FIGS. 1 and 2, the braking apparatus 20 includes a master cylinder 32 having a reservoir 34 for retaining a brake fluid. The master cylinder 32 includes a primary piston 36 and a secondary piston 38 spaced apart from each other. The master cylinder 32 defines a primary chamber 40 and a secondary chamber 42 spaced apart from each other for receiving and expelling the brake fluid. Preferably, the primary chamber 40 is disposed between the primary piston 36 and the secondary piston 38 and the secondary chamber 42 is disposed adjacent the secondary piston 38. However, it is to be appreciated that the primary piston 36, the secondary piston 38, the primary chamber 40, and secondary chamber 42 may be disposed in any configuration within the master cylinder 32. A rod 44 is coupled to the brake pedal 22 and the primary piston 36 for moving the primary piston 36 and the secondary piston 38 when a force 46 is applied to the brake pedal 22 (as shown in FIGS. 9 and 10). The master cylinder 32 further defines a primary port 48 and a secondary port 50 spaced apart from each other for allowing the brake fluid to flow in and out of the primary chamber 40 and the secondary chamber 42 of the master cylinder 32. Preferably, the primary port 48 allows fluid to flow in and out of the primary chamber 40 and the secondary port 50 allows fluid to flow in and out of the secondary chamber 42.

The braking apparatus 20 includes at least one hydraulically actuated brake, generally shown at 52, in electrical communication with the control unit 28. Preferably, the hydraulically actuated brake 52 is further defined as a plurality of hydraulic brakes 54 in fluid communication with the master cylinder 32. At least one rear wheel is coupled to the hydraulic brake 52. Preferably, the rear wheel is further defined as a plurality of rear wheels coupled to the hydraulic brakes 54. A power booster (not shown) may be disposed between the brake pedal 22 and the master cylinder 32 to amplify the force 46 applied to the brake pedal 22. However, it is to be appreciated that the power booster is optional due to the hydraulic brakes 54 being disposed on the rear wheels.

The braking apparatus 20 further includes at least one electrically actuated brake, generally shown at 60, in electrical communication with the control unit 28. Preferably, the electrically actuated brake 60 is further defined as a plurality of electric brakes 62. At least one front wheel is coupled to the electric brake 60. Preferable, the front wheel is further defined as a plurality of front wheels coupled to the electric brakes 62 and the front wheels create front wheel traction as the wheels rotate over a road. However, it is to be appreciated that the rear wheels create rear wheel traction as the wheels rotate over the road. An input shaft 63 is coupled to the front wheels and the motor-generator 26. As the vehicle decelerates, the input shaft 63 rotates through a magnetic field of the motor-generator 26 which generates energy and causes a braking torque. When the motor-generator 26 is signaled to generate energy, all or a portion of the mechanical energy generated from the rotating input shaft 63 may be utilized to decelerate the vehicle. All or a portion of the electrical energy generated by the motor-generator 26 may be used to recharge the battery 30 and subsequently used by the electric brakes 62 to further decelerate the vehicle as much as front wheel traction may allow or to otherwise achieve a prescribed front and rear braking balance necessary for vehicle stability and brake lining life. In other words, the electric brakes 62 may only decelerate the vehicle up to a limit of the front wheel traction. Therefore, if the requested force 46 on the brake pedal 22 is too large, then the vehicle is decelerating over the limit of the front wheel traction and the electric brakes 62 alone lack the ability to decelerate the vehicle so the hydraulic brakes 54 are blended in to achieve the requested vehicle deceleration and establish front and rear braking balance.

A plurality of wheel speed sensors 68 are coupled to each of the front wheels and the rear wheels for detecting the rotational speed of each of the wheels. More specifically, each of the hydraulic brakes 54 and each of the electric brakes 62 are coupled to respective wheel speed sensors 68. The wheel speed sensors 68 are in electrical communication with the control unit 28 for communicating the speed of the front wheels and the rear wheels to determine when the motor-generator 26 is unable to generate enough energy to recharge the battery 30 and decelerate the vehicle with the braking torque of the input shaft 63 and the electric brakes 62 working through the front wheel traction or to determine when front and rear braking balance is otherwise necessary.

A first fluid line 70 is coupled between the master cylinder 32 and the hydraulic brakes 54 for feeding the brake fluid to the hydraulic brakes 54. More specifically, the first fluid line 70 is coupled to the primary port 48 of the master cylinder 32. An isolation valve 72 is disposed along the first fluid line 70 and in electrical communication with the control unit 28. The isolation valve 72 includes a check valve 74 for providing one way flow of the brake fluid. At least one first pressure sensor 76 may be disposed along the first fluid line 70 for providing pressure information of the master cylinder 32 to the control unit 28 as generated by depressing the brake pedal 22 and for providing a safety warning system if the hydraulic brakes 54 fail. A plurality of apply valves 78 may be disposed along the first fluid line 70 between the isolation valve 72 and the hydraulic brakes 54 for allowing the brake fluid to flow into the hydraulic brakes 54. Each of the apply valves 78 include a check valve 80 for providing one way flow of the brake fluid. The apply valves 78 are in electrical communication with the control unit 28 for communicating when the brake fluid may flow into the hydraulic brakes 54.

A replenishment system, generally shown at 82, is in fluid communication with the master cylinder 32 and in electrical communication with the control unit 28. A second fluid line 84 is coupled between the master cylinder 32 and the replenishment system 82. More specifically, the second fluid line 84 is coupled to the secondary port 50 of the master cylinder 32. The brake fluid is fed from the master cylinder 32 to the replenishment system 82 during a first condition and fed from the replenishment system 82 into the hydraulic brakes 54 during a second condition after initial depression of the brake pedal 22 to provide consistent pedal feel and braking pressure while providing immediate braking response to decelerate the vehicle. The environment of the first condition and the second condition will be discussed in detail below.

Typically, during the first condition, the motor-generator 26 is generating enough energy to decelerate the vehicle utilizing the braking torque of the input shaft 63 and/or utilizing the electric brakes 62 only. When the braking apparatus 20 reaches maximum capabilities of the first condition, the second condition is activated. The second condition occurs when the input shaft 63 and the electric brakes 62 lack the ability to provide enough braking torque to satisfy the vehicle deceleration rate requested by the force 46 applied to the brake pedal 22 or when front and rear braking balance is otherwise required. Therefore, the second condition activates the hydraulic brakes 54 on the rear wheels to contribute to the vehicle deceleration. The hydraulic brakes 54 provide the braking difference between what the braking torque of the input shaft 63 and the electric brakes 62 can provide and the desired deceleration from the force 46 applied to the brake pedal 22, while at the same time preventing the brake pedal 22 from fluctuating. In other words, the hydraulic brakes 54 on the rear wheels are blended in with the electric brakes 62 as the motor-generator 26 loses the ability to adequately decelerate the vehicle through the electric brakes 62 on the front wheels, while providing consistent pedal feel and braking pressure. The control unit 28 determines when and how much of the hydraulic brakes 54 should be blended together with the electric brakes 62 when the brake pedal 22 is depressed.

The replenishment system 82 includes an emulator 86 in fluid communication with the master cylinder 32 for receiving and expelling the brake fluid. More specifically, the emulator 86 is coupled to the second fluid line 84. The emulator 86 defines a cavity 92 for receiving the brake fluid. A piston 88 and a spring 90 are disposed adjacent one another within the cavity 92. At least one second pressure sensor 94 may be disposed on the second fluid line 84 for providing an additional safety warning system if the hydraulic brakes 54 fail.

In the first embodiment of the braking apparatus 20 as shown in FIGS. 1 and 3, the replenishment system 82 further includes a first valve also referred to as an emulator inlet valve 96 and a second valve also referred to as an emulator outlet valve 98 in electrical communication with the control unit 28. The emulator inlet valve 96 and the emulator outlet valve 98 each have a check valve 100 for providing one way flow of the brake fluid. The emulator inlet valve 96 is in fluid communication with the master cylinder 32 and the emulator 86 for providing flow of the brake fluid to the emulator 86. Preferably, the brake fluid flows in one direction from the master cylinder 32 to the emulator 86 due to pressure within the second fluid line 84 and each of the check valves 100 of the emulator inlet valve 96 and the emulator outlet valve 98. The emulator inlet valve 96 and the emulator 86 are disposed along the second fluid line 84 for feeding the brake fluid from the master cylinder 32 to the emulator 86 during the first condition to provide appropriate displacement of the brake pedal 22.

A third fluid line 102 is coupled to the first fluid line 70 and the second fluid line 84. The third fluid line 102 is coupled to the first fluid line 70 at a position between the isolation valve 72 and the apply valves 78. The third fluid line 102 is coupled to the second fluid line 84 at a position between the emulator inlet valve 96 and the emulator 86. The emulator outlet valve 98 is in fluid communication with the emulator 86 for providing flow of the brake fluid from the emulator 86 to the hydraulic brakes 54. The emulator outlet valve 98 is disposed along the third fluid line 102 for feeding the brake fluid from the emulator 86 to the first fluid line 70 and into the hydraulic brakes 54 during the second condition. Preferably, the brake fluid flows in one direction from the emulator 86 to the hydraulic brakes 54 due to pressure within the third fluid line 102 and each of the check valves 100 of the emulator inlet valve 96 and the emulator outlet valve 98.

At least one pump 104 is disposed along the third fluid line 102 for pumping the brake fluid out of the emulator 86 and into the hydraulic brakes 54. A damper chamber 106 and an orifice 108 are disposed along the third fluid line 102 for aiding in the delivery of the brake fluid to the hydraulic brakes 54. A motor 110 is coupled to the pump 104 and in electrical communication with the control unit 28 for activating the pump 104 to feed the brake fluid from the third fluid line 102 to the first fluid line 70 and into the hydraulic brakes 54 during the second condition.

In the alternative, as shown in FIG. 3, it is contemplated that a plurality of pumps 104, 105, a plurality of damper chambers 106, 107, and a plurality of orifices 108, 109 may be used in the braking apparatus 20. If the braking apparatus 20 uses more than one pump 104, 105, the pumps 104, 105 are disposed in parallel to one another. An accumulator 112 may be coupled to one of the pumps 105 for receiving and expelling the brake fluid when the anti-lock brake system is activated. Typically, the distinction between the accumulator 112 and the emulator 86 is the spring 90 of the emulator 86 is significantly stiffer.

In operation of the braking apparatus 20 during the first condition, the brake pedal 22 is initially depressed with the force 46. Typically, the first condition occurs when the vehicle is decelerating below 0.3 g. As the vehicle decelerates, the input shaft 63 rotates through the magnetic field of the motor-generator 26 which causes the braking torque and generates energy. The motor-generator 26 generates energy to recharge the battery 30 and supply energy to the electric brakes 62 to further decelerate the vehicle up to the limit of the front wheel traction or up to an otherwise prescribed front and rear braking balance limit. The control unit 28 closes the apply valves 78 on the first fluid line 70 to prevent the brake fluid from flowing into the hydraulic brakes 54. The control unit 28 opens the emulator inlet valve 96 on the second fluid line 84 for allowing the brake fluid to flow from the secondary chamber 42 of the master cylinder 32 and into the emulator 86 to provide the appropriate displacement of the brake pedal 22 for consistent brake pedal feel and braking pressure. In other words, during the first condition the vehicle is decelerating by the braking torque of the input shaft 63 and the electric brakes 62 only.

As the vehicle continues to decelerate, the second condition occurs which is typically when the vehicle is decelerating above 0.3 g. The motor-generator 26 lacks the ability to generate enough energy to stop the vehicle quickly enough by the braking torque of the input shaft 63 and the electric brakes 62 working through the front wheel traction or to maintain adequate front and rear braking balance; therefore, the control unit 28 activates the hydraulic brakes 54 on the rear wheels. The control unit 28 closes the emulator inlet valve 96 on the second fluid line 84 and opens the emulator outlet valve 98 on the third fluid line 102 for allowing the brake fluid to flow through the third fluid line 102. The control unit 28 closes the isolation valve 72 on the first fluid line 70 for preventing the brake fluid from returning to the master cylinder 32. The apply valves 78 on the first fluid line 70 are opened by the control unit 28 for allowing the brake fluid to flow into the hydraulic brakes 54. The control unit 28 communicates with the motor to activate the pump 104. The pump 104 starts pumping the brake fluid out of the emulator 86, through the third fluid line 102, through the first fluid line 70 and into the hydraulic brakes 54. In other words, the hydraulic brakes 54 on the rear wheels are blended in to provide the braking difference between what the braking torque of the input shaft 63 and the electric brakes 62 can provide and the force 46 applied to the brake pedal 22 to provide consistent pedal feel and braking pressure while providing immediate braking response to decelerate the vehicle.

Figure 4:
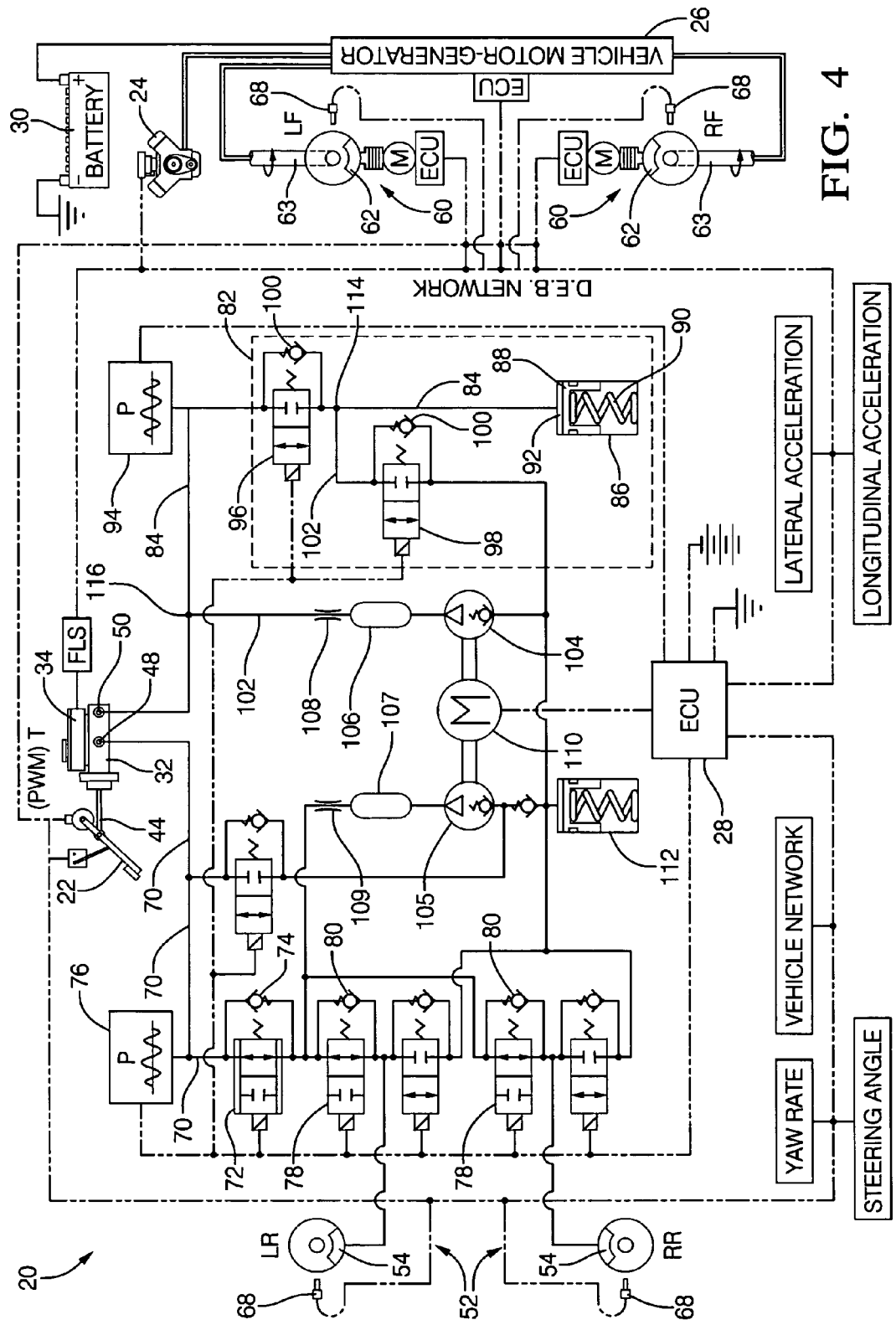
FIG. 4 is a schematic view of a second embodiment of a braking apparatus.

As shown in FIGS. 4-10, a second embodiment of the braking apparatus 20 is shown wherein like numerals indicate like or corresponding parts throughout the several views. The braking apparatus 20 includes the third fluid line 102 coupled to the second fluid line 84 at a first position 114 and a second position 116. As best shown in FIG. 4, the first position 114 is disposed between the emulator inlet valve 96 and the emulator 86 and the second position 116 is disposed between the master cylinder 32 and the emulator inlet valve 96 on the second fluid line 84. The pump 104 is disposed along the third fluid line 102 for pumping the brake fluid out of the emulator 86 and into the hydraulic brake 54. The damper chamber 106 and the orifice 108 are disposed along the third fluid line 102 for aiding in the delivery the brake fluid to the hydraulic brakes 54.

Figure 5:
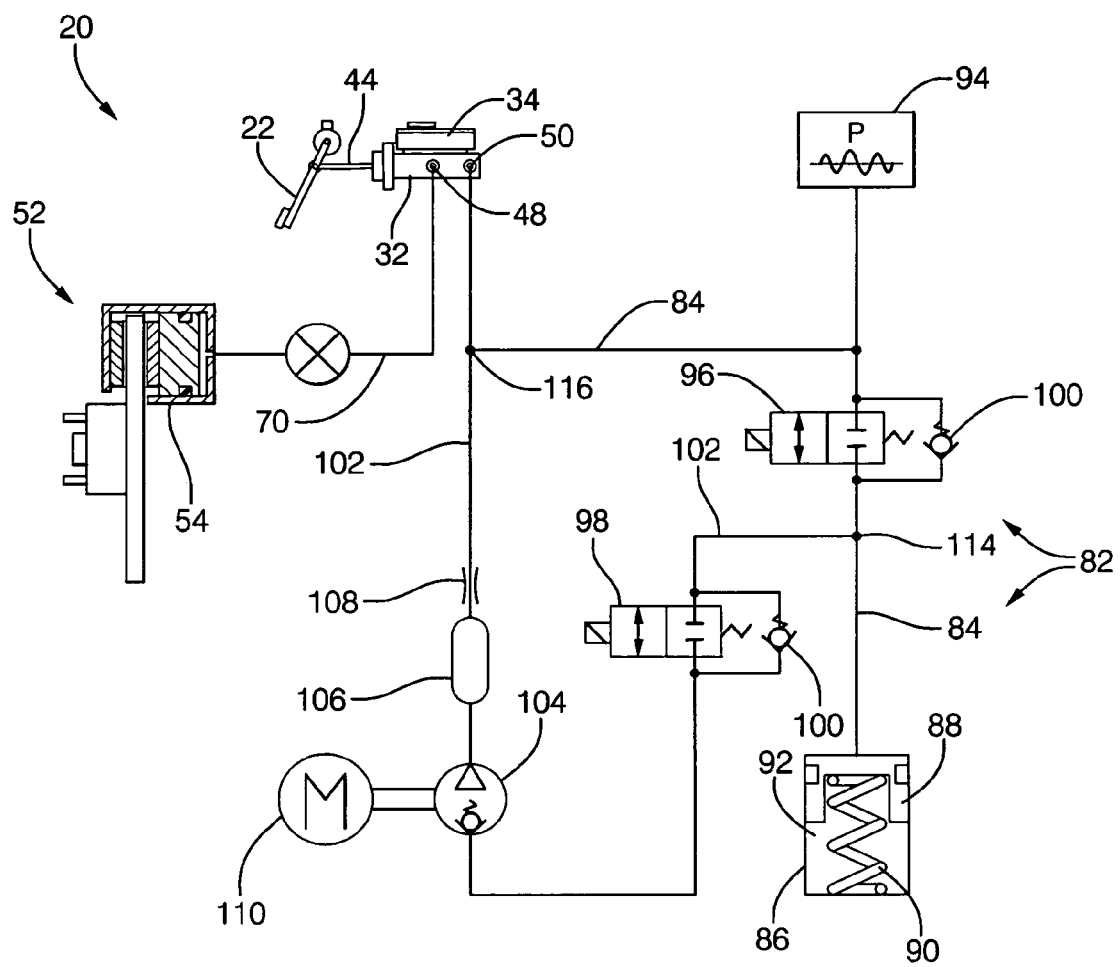
FIG. 5 is a partial schematic view of the second embodiment before depressing a brake pedal.
Figure 6:
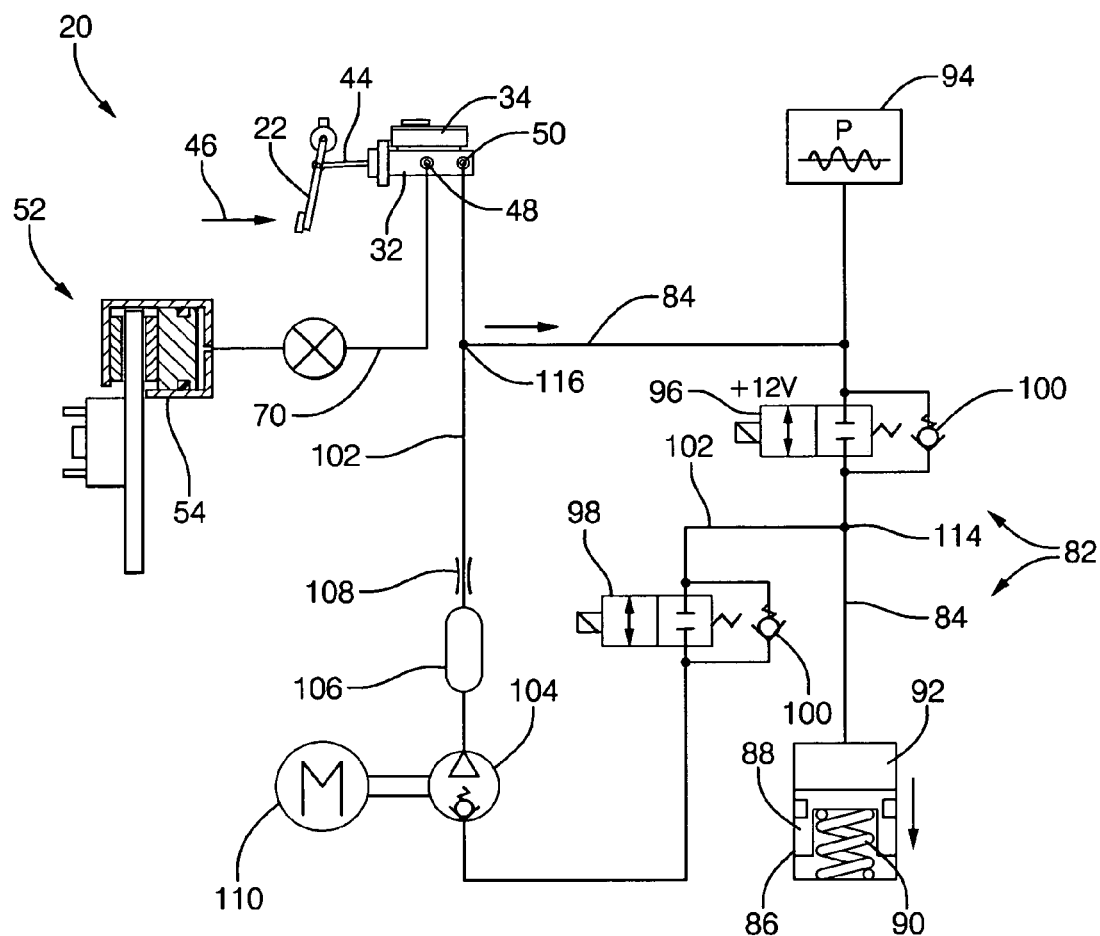
FIG. 6 is a partial schematic view of the second embodiment during a first condition after initially depressing the brake pedal.
Figure 8:
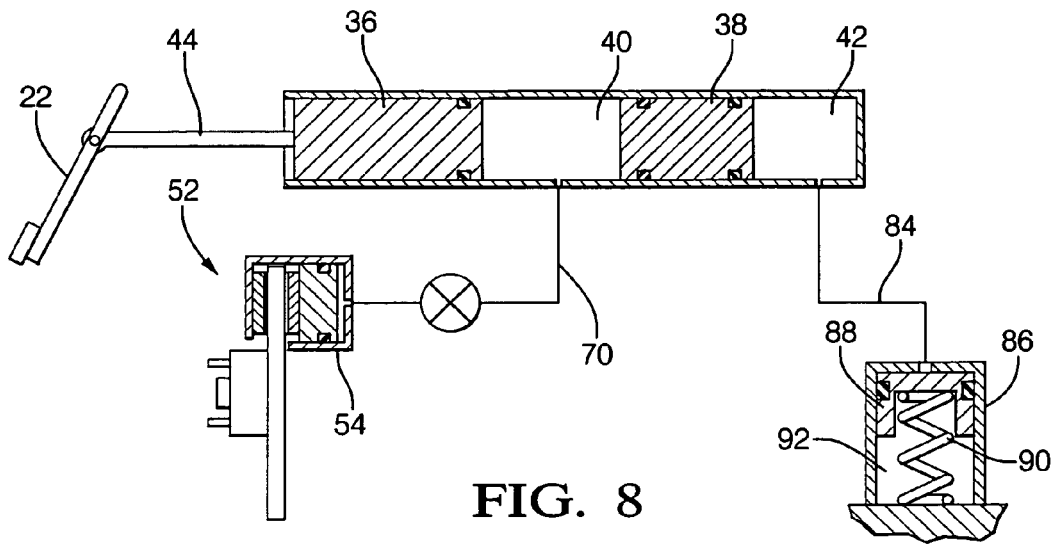
FIG. 8 is a cross-sectional view of the second embodiment and a third embodiment of a master cylinder, an emulator, and a hydraulically actuated brake before depressing a brake pedal.

Referring to FIGS. 5 and 8, a partial schematic view of the braking apparatus 20 is shown before the brake pedal 22 is depressed, wherein the brake fluid remains in the master cylinder 32. A partial schematic view of the braking apparatus 20 is shown during the first condition in FIG. 6. The first condition occurs when the brake pedal 22 is initially depressed with the force 46. Typically this is when the vehicle is decelerating below 0.3 g. As the vehicle decelerates, the input shaft 63 rotates through the magnetic field of the motor-generator 26 which causes the braking torque and generates energy. The motor-generator 26 generates energy to recharge the battery 30 and supply energy to the electric brakes 62 to further decelerate the vehicle up to the limit of the front wheel traction or up to the otherwise prescribed front and rear braking balance limit. The control unit 28 closes the apply valves 78 on the first fluid line 70 to prevent the brake fluid from flowing into the hydraulic brakes 54 of the rear wheels. The control unit 28 opens the emulator inlet valve 96 on the second fluid line 84 to allow the brake fluid to flow from the secondary chamber 42 of the master cylinder 32 and into the emulator 86 to provide the appropriate displacement of the brake pedal 22 for consistent brake pedal feel and braking pressure (as shown in FIG. 9). In other words, during the first condition the vehicle is decelerating by the braking torque of the input shaft 63 and the electric brakes 62 only.

Figure 7:
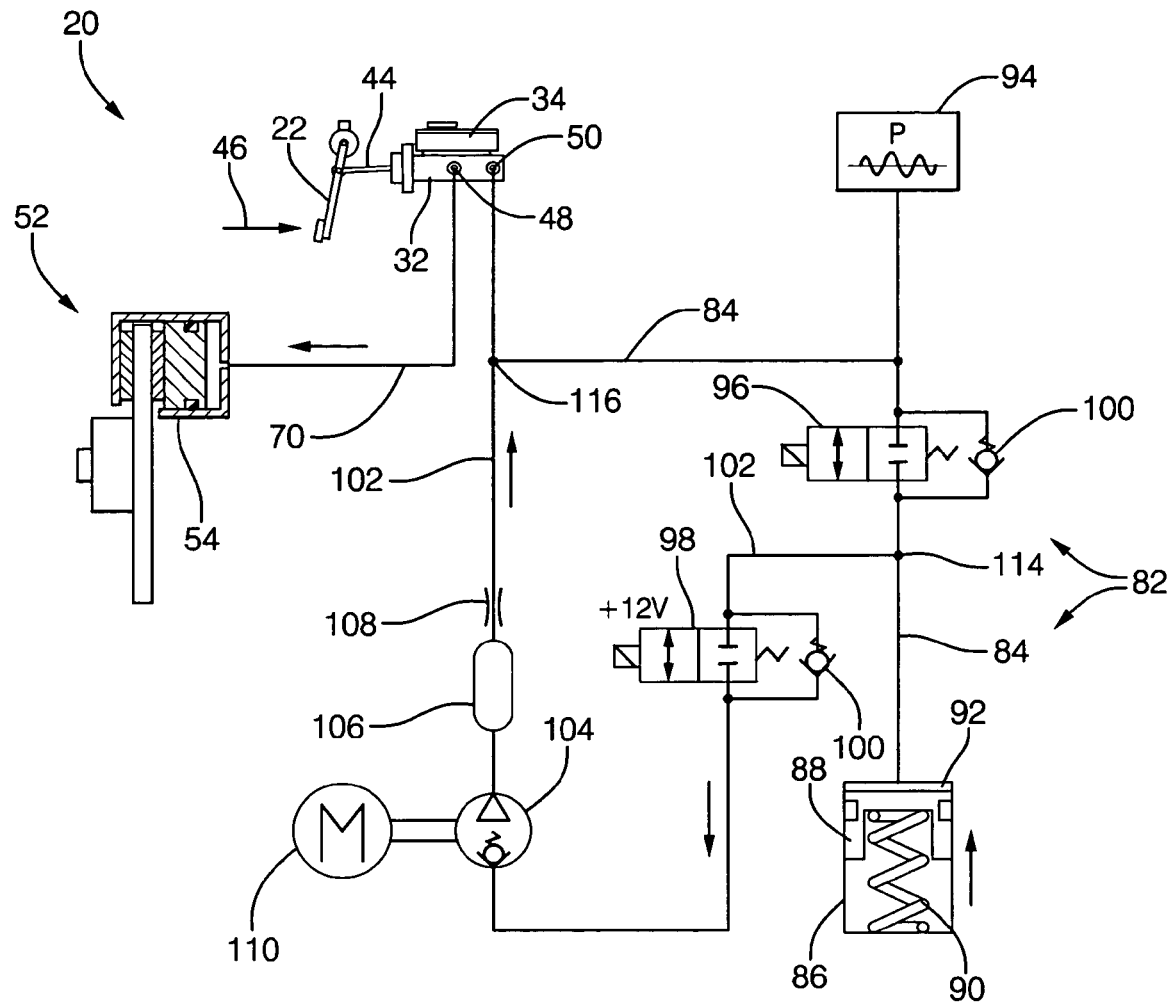
FIG. 7 is a partial schematic view of the second embodiment during a second condition after initially depressing the brake pedal.

Referring to FIG. 7, a partial schematic of the braking apparatus 20 is shown during the second condition. As the vehicle continues to decelerate, the second condition occurs which is typically when the vehicle is decelerating above 0.3 g. The motor-generator 26 lacks the ability to generate enough energy to stop the vehicle quickly enough by the braking torque of the input shaft 63 and the electric brakes 62 working through the front wheel traction or to maintain adequate front and rear braking balance; therefore, the control unit 28 activates the hydraulic brakes 54 on the rear wheels. The control unit 28 closes the emulator inlet valve 96 on the second fluid line 84 and opens the emulator outlet valve 98 on the third fluid line 102 for allowing the brake fluid to flow through the third fluid line 102, back into the secondary chamber 42 of the master cylinder 32, and into the hydraulic brakes 54. The control unit 28 opens the apply valves 78 and the isolation valve 72 on the first fluid line 70 for allowing the brake fluid to flow from the master cylinder 32 and into the hydraulic brakes 54. The control unit 28 communicates with the motor 110 to activate the pump 104. The pump 104 starts pumping the brake fluid out of the emulator 86, through the third fluid line 102 and back into the secondary chamber 42 of the master cylinder 32. As shown in FIG. 10, as the brake fluid fills the secondary chamber 42, the secondary piston 38 moves laterally toward the primary piston 36 which forces the brake fluid out of the primary chamber 40 and into the first fluid line 70 and ultimately into the hydraulic brakes 54. In other words, the hydraulic brakes 54 on the rear wheels are blended in to provide the braking difference between what the braking torque of the input shaft 63 and the electric brakes 62 can provide and the force 46 applied to the brake pedal 22 to provide consistent pedal feel and braking pressure while providing immediate braking response to decelerate the vehicle.

As shown in FIGS. 8-14, a third embodiment of the braking apparatus 20 is shown wherein like numerals indicate like or corresponding parts throughout the several views. The braking apparatus 20 of the third embodiment may eliminate the emulator inlet valve 96, the emulator outlet valve 98, and one of the pumps 104. In addition, the third fluid line 102 may be eliminated. However, it is to be appreciated that if the third fluid line 102 is utilized, the third fluid line 102 may be coupled to the first fluid line 70 and the second fluid line 84 in the same way as the first embodiment.

Figure 11:
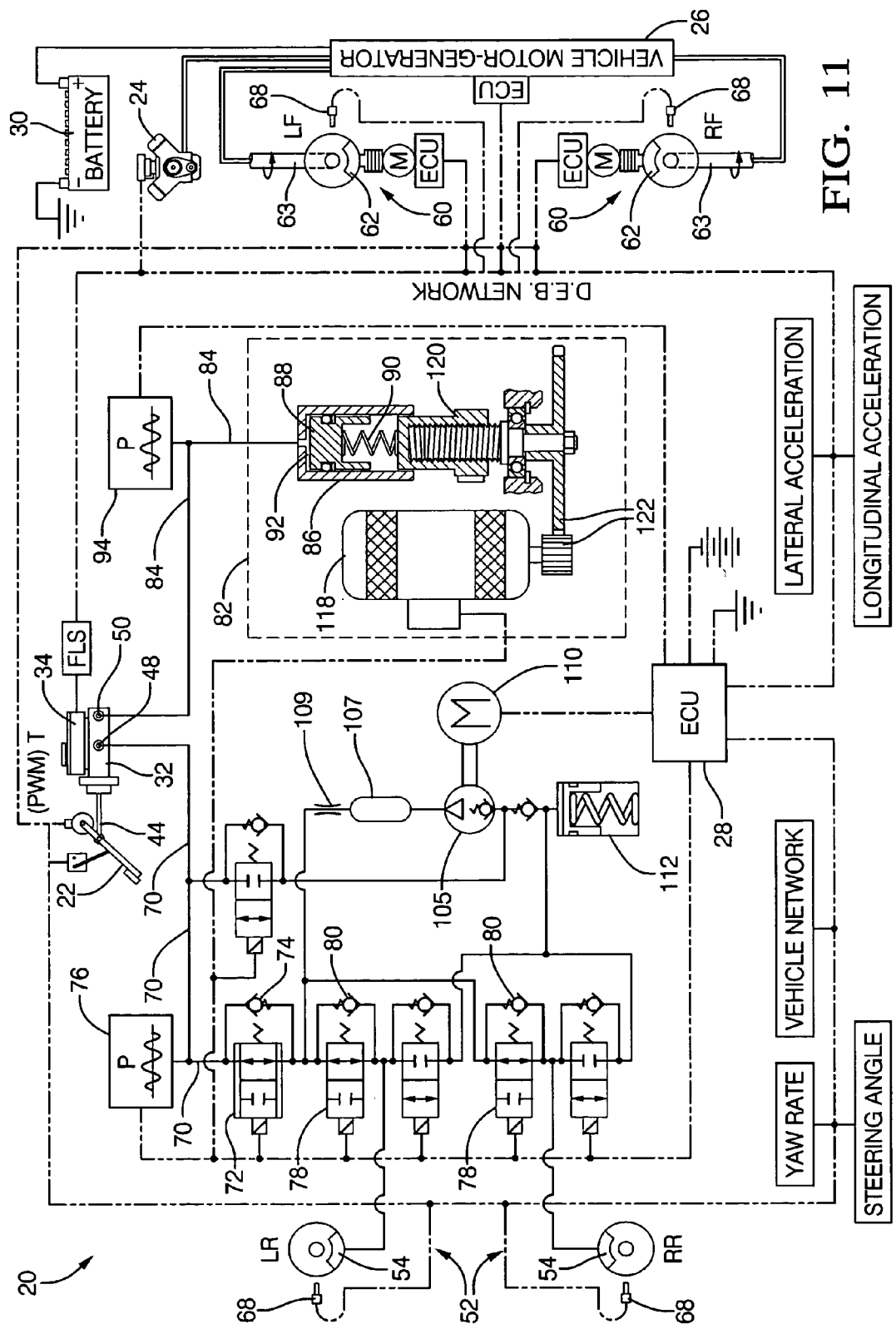
FIG. 11 is a schematic view of the third embodiment of a braking apparatus.

Referring to FIG. 11, the replenishment system 82 further includes an electric motor 118 coupled to the emulator 86 and in electrical communication with the control unit 28 for feeding the brake fluid from the emulator 86 to the hydraulic brakes 54 during the second condition. The emulator 86 includes a ball screw drive mechanism 120 adjacent the spring 90 and the piston 88 for moving the piston 88 within the cavity 92. It is contemplated that the spring 90 is optional. A plurality of gears 122 are coupled to the electric motor 118 and the emulator 86 for moving the ball screw drive mechanism 120 during the second condition.

Figure 12:
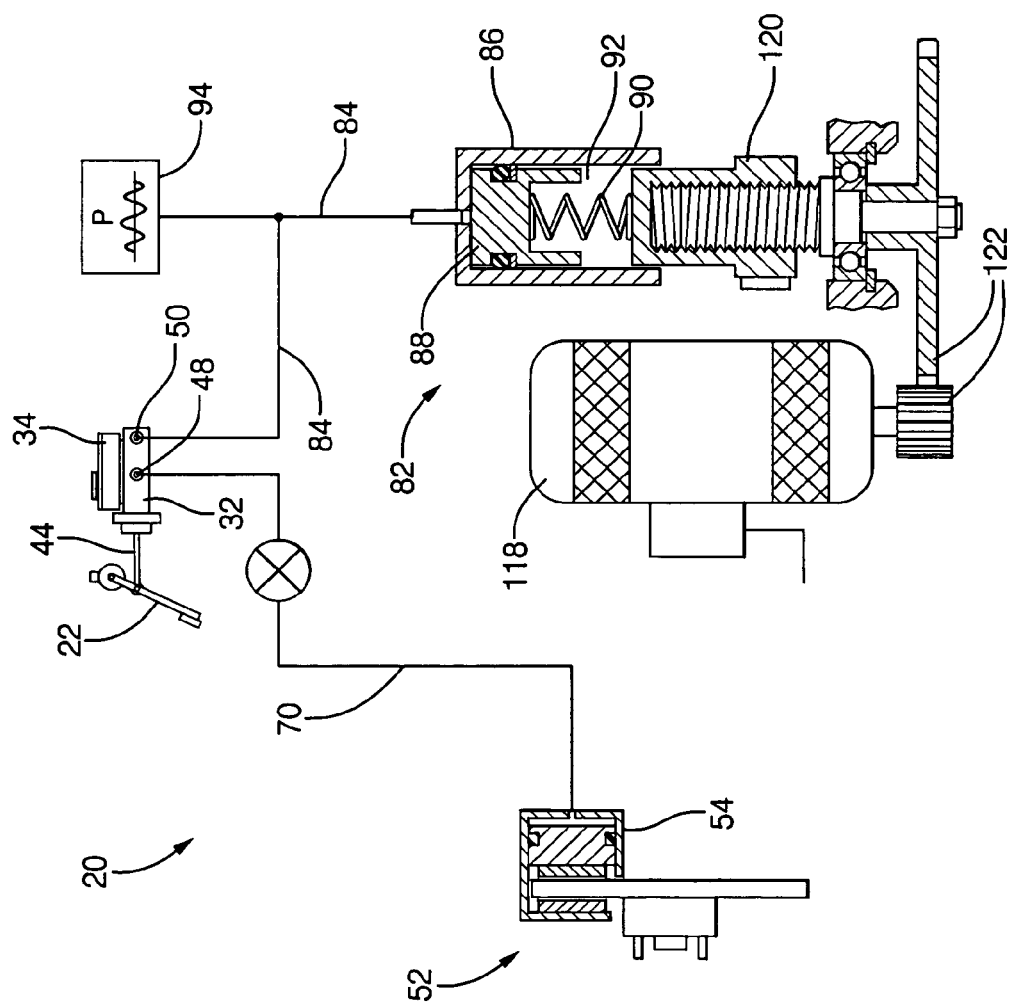
FIG. 12 is a partial schematic view of the third embodiment before depressing a brake pedal.
Figure 13:
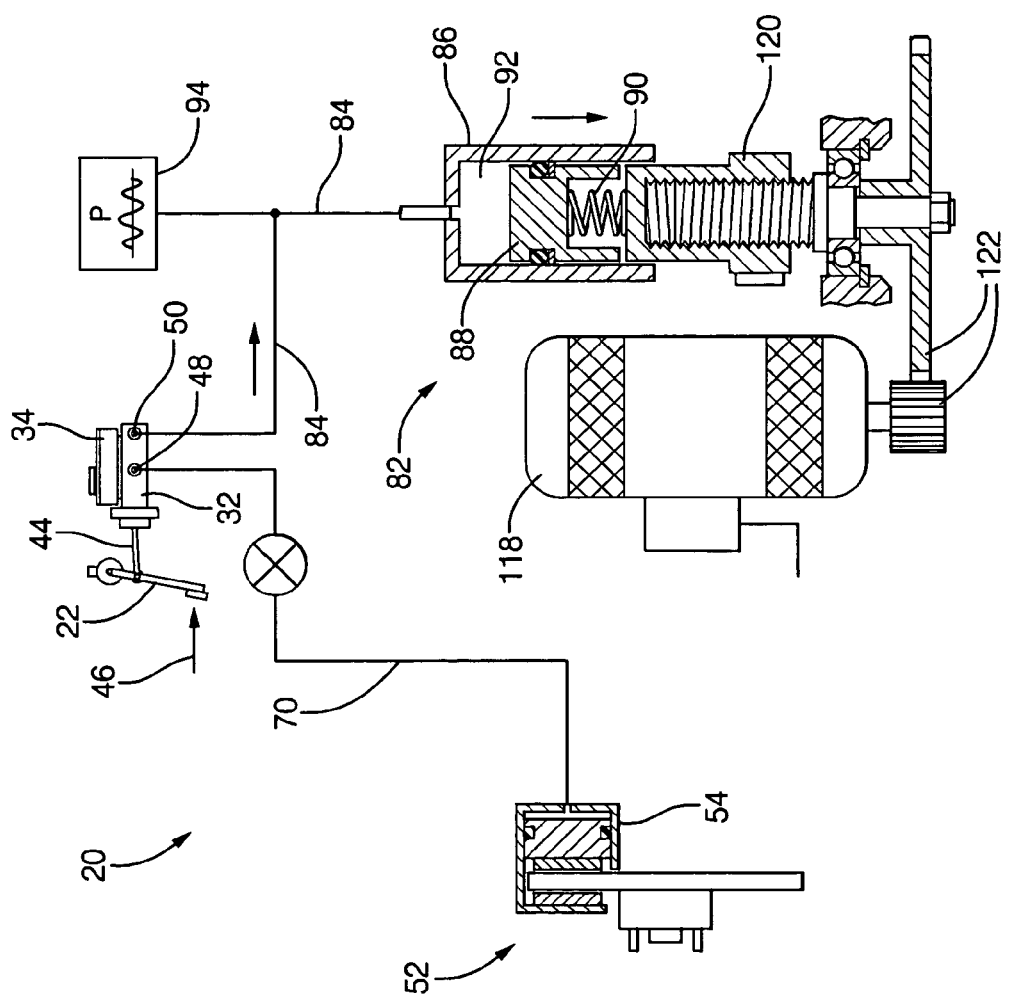
FIG. 13 is a partial schematic view of the third embodiment during a first condition after initially depressing the brake pedal.

Referring to FIGS. 8 and 12, a partial schematic view of the braking apparatus 20 is shown before the brake pedal 22 is depressed, wherein the brake fluid remains in the master cylinder 32. A partial schematic view of the braking apparatus 20 is shown during the first condition in FIG. 13. The first condition occurs when the brake pedal 22 is initially depressed with the force 46. Typically this is when the vehicle is decelerating below 0.3 g. As the vehicle decelerates, the input shaft 63 rotates through the magnetic field of the motor-generator 26 which causes the braking torque and generates energy. The motor-generator 26 generates energy to recharge the battery 30 and supply energy to the electric brakes 62 to further decelerate the vehicle up to the limit of the front wheel traction or up to an otherwise prescribed front and rear braking balance limit. The control unit 28 closes the apply valves 78 on the first fluid line 70 to prevent the brake fluid from flowing into the hydraulic brakes 54 on the rear wheels. The brake fluid flows from the secondary chamber 42 of the master cylinder 32 and into the emulator 86 to provide the appropriate displacement of the brake pedal 22 for consistent pedal feel and braking pressure (as shown in FIG. 9). In other words, during the first condition the vehicle is decelerating by the braking torque of the input shaft 63 and the electric brakes 62 only.

Figure 14:
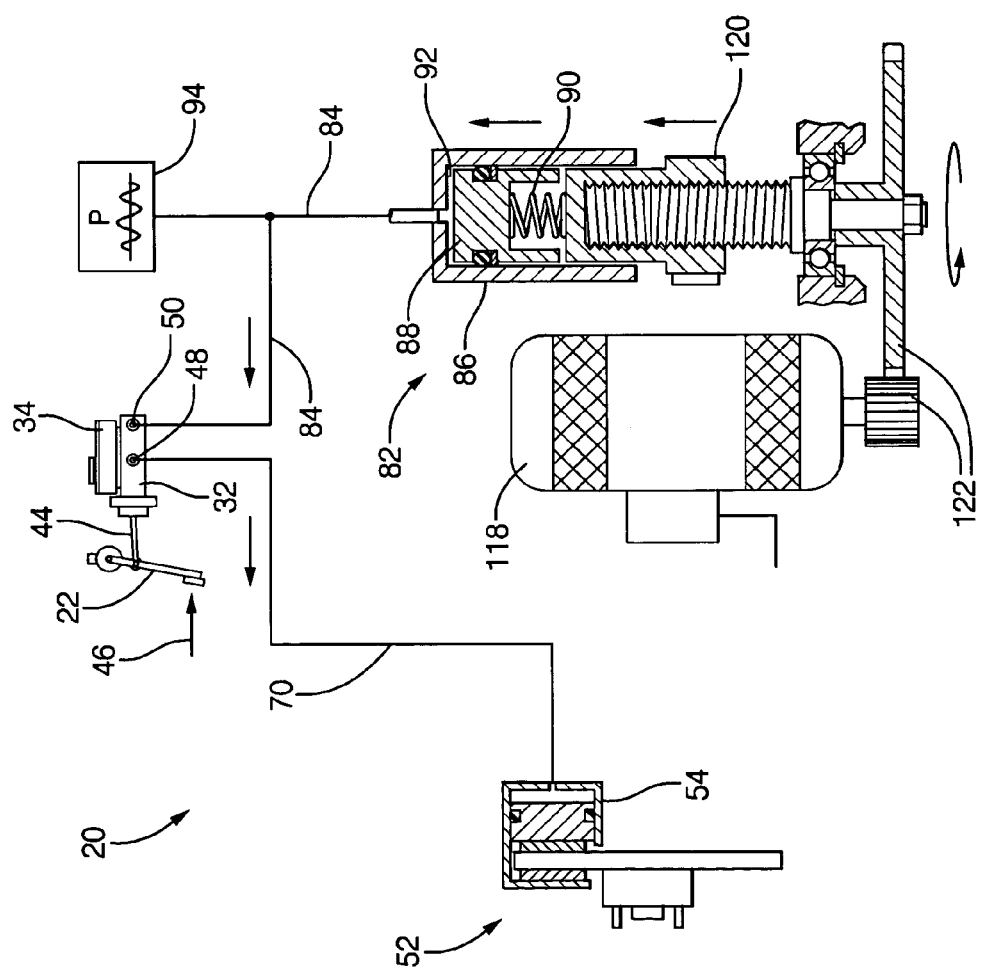
FIG. 14 is a partial schematic view of the third embodiment during a second condition after initially depressing the brake pedal.

Referring to FIG. 14, a partial schematic of the braking apparatus 20 is shown during the second condition. As the vehicle continues to decelerate, the second condition occurs which is typically when the vehicle is decelerating above 0.3 g.

The motor-generator 26 lacks the ability to generate enough energy to stop the vehicle quickly enough by the braking torque of the input shaft 63 and the electric brakes 62 working through the front wheel traction or to maintain adequate front and rear braking balance; therefore, the control unit 28 activates the hydraulic brakes 54 on the rear wheels. The control unit 28 opens the apply valves 78 and the isolation valve 72 on the first fluid line 70 for allowing the brake fluid to flow from the master cylinder 32 and into the hydraulic brakes 54. The control unit 28 communicates with the electric motor 118 to activate the emulator 86. The gears 122 begin to rotate to move the ball screw drive mechanism 120 and the piston 88 which expels the brake fluid from cavity 92 of the emulator 86, through the second fluid line 84 and back into the secondary chamber 42 of the master cylinder 32. As shown in FIG. 10, when the brake fluid fills the secondary chamber 42, the secondary piston 38 moves laterally toward the primary piston 36 which forces 46 the brake fluid out of the primary chamber 40 and into the first fluid line 70 and ultimately into the hydraulic brakes 54. In other words, the hydraulic brakes 54 on the rear wheels are blended in to provide the braking difference between what the braking torque of the input shaft 63 and the electric brakes 62 can provide and the force 46 applied to the brake pedal 22 to provide consistent pedal feel and braking pressure while providing immediate braking response to decelerate the vehicle.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A braking apparatus for a vehicle having a plurality of wheels, said apparatus comprising;
   a brake pedal for receiving a force to initiate braking of the vehicle,
   a speed sensor for detecting a speed of the vehicle,
   a master cylinder having a reservoir for retaining a brake fluid,
   at least one hydraulically actuated brake coupled to one of said wheels and in fluid communication with said master cylinder,
   at least one electrically actuated brake coupled to one other of said wheels,
   a replenishment system in fluid communication with said master cylinder and said hydraulically actuated brake, and
   a control unit in electrical communication with said brake pedal and said speed sensor and said brakes for receiving said force and determining a requested vehicle deceleration rate as a function of said force and comparing said requested vehicle deceleration rate to a predetermined deceleration threshold and operating the braking apparatus in a first condition defined by said brake fluid being fed into said replenishment system and only said electrically actuated brake being applied in response to said requested vehicle deceleration rate being below said predetermined deceleration threshold and operating the braking apparatus in a second condition defined by said brake fluid being fed from said replenishment system into said hydraulically actuated brake to apply and blend said hydraulically actuated brake with said electrically actuated brake in response to said requested vehicle deceleration rate being above said predetermined deceleration threshold.

2. An apparatus as set forth in claim 1 wherein said replenishment system further includes an emulator in fluid communication with said master cylinder and said hydraulically actuated brake for receiving the brake fluid from said master cylinder during said first condition to provide appropriate displacement of the brake pedal when only said electrically actuated brake is applied and expelling the brake fluid to said hydraulically actuated brake during said second condition.

3. An apparatus as set forth in claim 2 further defined by;
   a second fluid line coupled between said master cylinder and said emulator for establishing said fluid communication,
   said replenishment system including an inlet valve disposed along said second fluid line, and
   said control unit in electrical communication with said inlet valve for opening said inlet valve during said first condition to provide flow of the brake fluid to said emulator and closing said inlet valve during second condition for stopping the flow of brake fluid to said emulator.

4. An apparatus as set forth in claim 3 further defined by;
   a first fluid line coupled between said master cylinder and said hydraulically actuated brake,
   a third fluid line coupled between said emulator and said first fluid line for establishing said fluid communication between said emulator and said hydraulically actuated brake,
   said replenishment system including an outlet valve disposed along said third fluid line, and
   said control unit in electrical communication with said outlet valve for closing said outlet valve during said first condition and opening said outlet valve during said second condition.

5. An apparatus as set forth in claim 4 wherein said inlet valve and said outlet valve each include a cheek valve for providing one way flow of the brake fluid.

6. An apparatus as set forth in claim 5 further including an isolation valve disposed along said first fluid line for preventing the brake fluid from returning to said master cylinder during said second condition.

7. An apparatus as set forth in claim 6 wherein said third fluid line is coupled to said second fluid line at a position between said inlet valve and said emulator.

8. An apparatus as set forth in claim 7 further including at least one pump disposed along said third fluid line for pumping the brake fluid out of said emulator and to said hydraulically actuated brake during said second condition.

9. An apparatus as set forth in claim 6 further including a third fluid line disposed at a first position between first inlet valve and said emulator and disposed at a second position between said master cylinder and said inlet valve along said second fluid line.

10. An apparatus as set forth in claim 9 wherein said master cylinder further includes a primary piston and a secondary piston spaced apart from each other for moving the brake fluid through said first fluid line and said second fluid line.

11. An apparatus as set forth in claim 10 wherein said master cylinder further defines a primary chamber disposed between said primary piston and said secondary piston and a secondary chamber disposed adjacent said secondary piston for receiving and expelling the brake fluid during the second condition.

12. An apparatus as set forth in claim 9 further including at least one pump disposed along said third fluid line for pumping the brake fluid out of said emulator and into said hydraulically actuated brake during the second condition.

13. An apparatus as set forth in claim 2 wherein said replenishment system further includes an electric motor coupled to said emulator and in electrical communication with said control unit for feeding the brake fluid from said emulator to said hydraulically actuated brake during the second condition.

14. An apparatus as set forth in claim 13 further including a first fluid line coupled between said master cylinder and said hydraulically actuated brake for feeding the brake fluid to said hydraulically actuated brake.

15. An apparatus as set forth in claim 14 further including a second fluid line coupled between said master cylinder and said replenishment system with said emulator disposed along said second fluid line for feeding the brake fluid from said master cylinder to said emulator during the first condition.

16. An apparatus as set forth in claim 15 wherein said master cylinder further includes a primary piston and a secondary piston spaced apart from each other for moving the brake fluid through said first fluid line and said second fluid line.

17. An apparatus as set forth in claim 16 wherein said master cylinder further defines a primary chamber disposed between said primary piston and said secondary piston and a secondary chamber disposed adjacent said secondary piston for receiving and expelling the brake fluid during the second condition.

18. An apparatus as set forth in claim 1 wherein said predetermined deceleration threshold is equal to 0.3 g.

19. A braking apparatus for a vehicle having a plurality of wheels, said apparatus comprising:
   a brake pedal for receiving a force to initiate braking of the vehicle,
   a master cylinder having a reservoir for retaining a brake fluid,
   at least one hydraulically actuated brake coupled to one of said wheels and in fluid communication with said master cylinder,
   at least one electrically actuated brake coupled to one other of said wheels,
   a replenishment system in fluid communication with said master cylinder and said hydraulically actuated brake, and
   a control unit in electrical communication with said brake pedal and said hydraulically actuated brake and said electrically actuated brake for receiving said force and determining a requested vehicle deceleration rate as a function of said force for only operating the braking apparatus in a first condition with said brake fluid being fed into said replenishment system and with only said electrically actuated brake being applied in response to said requested deceleration rate being below the limit of said electrically actuated brake and the wheel associated with said electrically actuated brake and for only operating the braking apparatus in a second condition with said brake fluid being fed from said replenishment system into said hydraulically actuated brake to apply and blend said hydraulically actuated brake with said electrically actuated brake in response to said requested vehicle deceleration rate being above the limit of said electrically actuated brake and the wheel associated with said electrically actuated brake.

* * * * *

UNITED STATES PATENT AND TRADEMARK OFFICE
CERTIFICATE OF CORRECTION

| | | |
|---|---|---|
| PATENT NO. | : 7,926,888 B2 | Page 1 of 1 |
| APPLICATION NO. | : 11/487158 | |
| DATED | : April 19, 2011 | |
| INVENTOR(S) | : David F. Reuter et al. | |

It is certified that error appears in the above-identified patent and that said Letters Patent is hereby corrected as shown below:

Column 10, Claim 5, Line 15: "cheek" should read -- check --.

Column 10, Claim 9, Line 29: "first" should read -- said --.

Signed and Sealed this
Thirty-first Day of May, 2011

David J. Kappos
*Director of the United States Patent and Trademark Office*